United States Patent

[11] 3,629,617

[72] Inventor Gerald F. McGowan
Littleton, Colo.
[21] Appl. No. 13,264
[22] Filed Feb. 20, 1970
[45] Patented Dec. 21, 1971
[73] Assignee Martin Marietta Corporation
New York, N.Y.

[54] VOLTAGE-CONTROLLED LOGARITHMIC ATTENUATOR
5 Claims, 5 Drawing Figs.

[52] U.S. Cl. .......... 307/257, 328/145, 307/229
[51] Int. Cl. .......... H03k 17/74
[50] Field of Search .......... 307/229, 257, 259; 333/81; 328/145

[56] References Cited

UNITED STATES PATENTS

| | | | |
|---|---|---|---|
| 2,003,428 | 6/1935 | Cowan | 333/81 |
| 2,829,251 | 4/1958 | Patton | 307/257 |
| 2,952,006 | 9/1960 | McCarter | 333/81 |
| 2,967,909 | 1/1961 | Rice | 307/257 |
| 3,135,934 | 6/1964 | Schoenike | 333/81 |
| 3,492,501 | 1/1970 | Allen et al. | 307/257 |

*Primary Examiner*—Donald D. Forrer
*Assistant Examiner*—Harold A. Dixon
*Attorneys*—Phillip L. De Arment and Gay Chin

ABSTRACT: A voltage-controlled attenuation circuit providing an approximate linear relationship between a control voltage and the logarithm of the circuit attenuation ratio. The circuit includes parallel diode voltage dividers connected in parallel with a signal source and a source of control voltage which drives two pairs of current bias sources. The signal current adds to and subtracts from the bias current in each of the voltage dividers to yield a logarithmic voltage output across the summing resistors forming an output circuit across the pair of voltage dividers.

INVENTOR.
GERALD F. McGOWAN
BY
Anderson, Spangler + Wymore
ATTORNEY

INVENTOR.
GERALD F. McGOWAN
BY
Anderson, Spangler + Wymore
ATTORNEY

INVENTOR.
GERALD F. McGOWAN
BY Anderson, Spangler & Wymore
ATTORNEY

INVENTOR.
GERALD F. McGOWAN
BY
Anderson, Spangler + Wymore
ATTORNEY

VOLTAGE-CONTROLLED LOGARITHMIC ATTENUATOR

The present invention relates to an electrical signal attenuator and, more particularly, to one where the attenuation varies exponentially as a function of an input control voltage.

Automatic gain control (AGC) amplifier networks are often designed to provide an indication of input signal magnitude in addition to compensation for unpredictable variations in signal amplitude. A logarithmic indication of input signal is highly desirable because of the large possible variation of received signal power. Conventional discrete and integrated circuit AGC amplifiers normally exhibit a logarithmic characteristic over a small range of signal amplitudes but depart widely from logarithmic response when the signal amplitude variations exceed 20 db.

Therefore, it is the primary object of the present invention to provide a near logarithmic relationship between AGC control voltage and the signal attenuation over an input signal range of 40 db. with nonsignificant signal distortion.

Another object of the present invention is to provide a circuit which may be advantageously employed in logarithmic function generators or like circuits.

A still further object of the invention is to provide an attenuation circuit which is capable, within predetermined design parameters, of accommodating a wide range of control voltage amplitudes.

Other and further objects of the invention will become apparent from the following detailed description of a preferred form of the invention taken in conjunction with accompanying drawings in which.

The circuit of the present invention derives its basic characteristics from one of its diode components. The conventional junction diode exhibits a logarithmic voltage-current relationship in the forward bias region. In this region it may be shown that incremental resistance is defined as follows;

$$R_{\mathrm{inc}}=\frac{\frac{KT}{q}}{I}$$

where $K$ = Boltzmann's constant
$T$ = Absolute temperature
$q$ = Charge of an electron
$I$ = Forward bias current, and $$\frac{KT}{q}=0.026 \text{ volt at } 25° \text{ C.}$$

Figure 1:
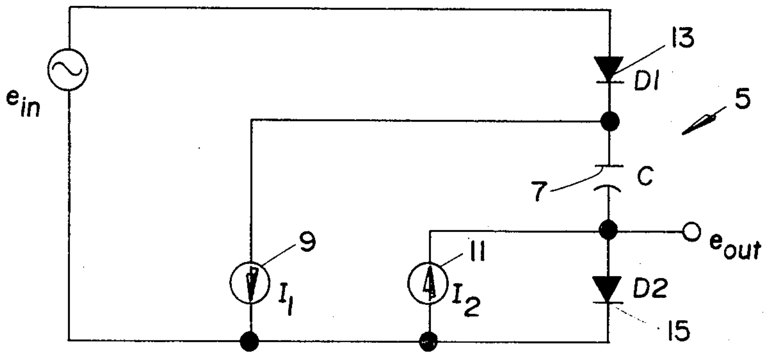
FIG. 1 is a diagram of a simplified diode attenuator, illustrated primarily for purposes of comparison.

This characteristic could be utilized in a very simple form of diode attenuator circuit, as illustrated in FIG. 1. In this double diode circuit 5 a capacitor 7 is used to isolate the two DC current sources 9 and 11. If the impedance of the capacitor 7 is much smaller than the diode impedances, its effect may be neglected and the attenuation ration ($A_R$) of the circuit may be determined by the incremental resistances of the diodes 13 and 15. The expression for attenuation ratio then becomes:

$$A_R=\frac{1}{1+\left(\frac{I_1}{I_2}\right)}$$

Although such an arrangement will produce the desired attenuation, it also produces a significant amount of distortion since the signal current adds to the bias current during one-half of a cycle of the input and subtracts from the bias current during the other half of the cycle. This addition and subtraction and the resultant distortion limits the signal magnitude to a very low value.

Figure 2:
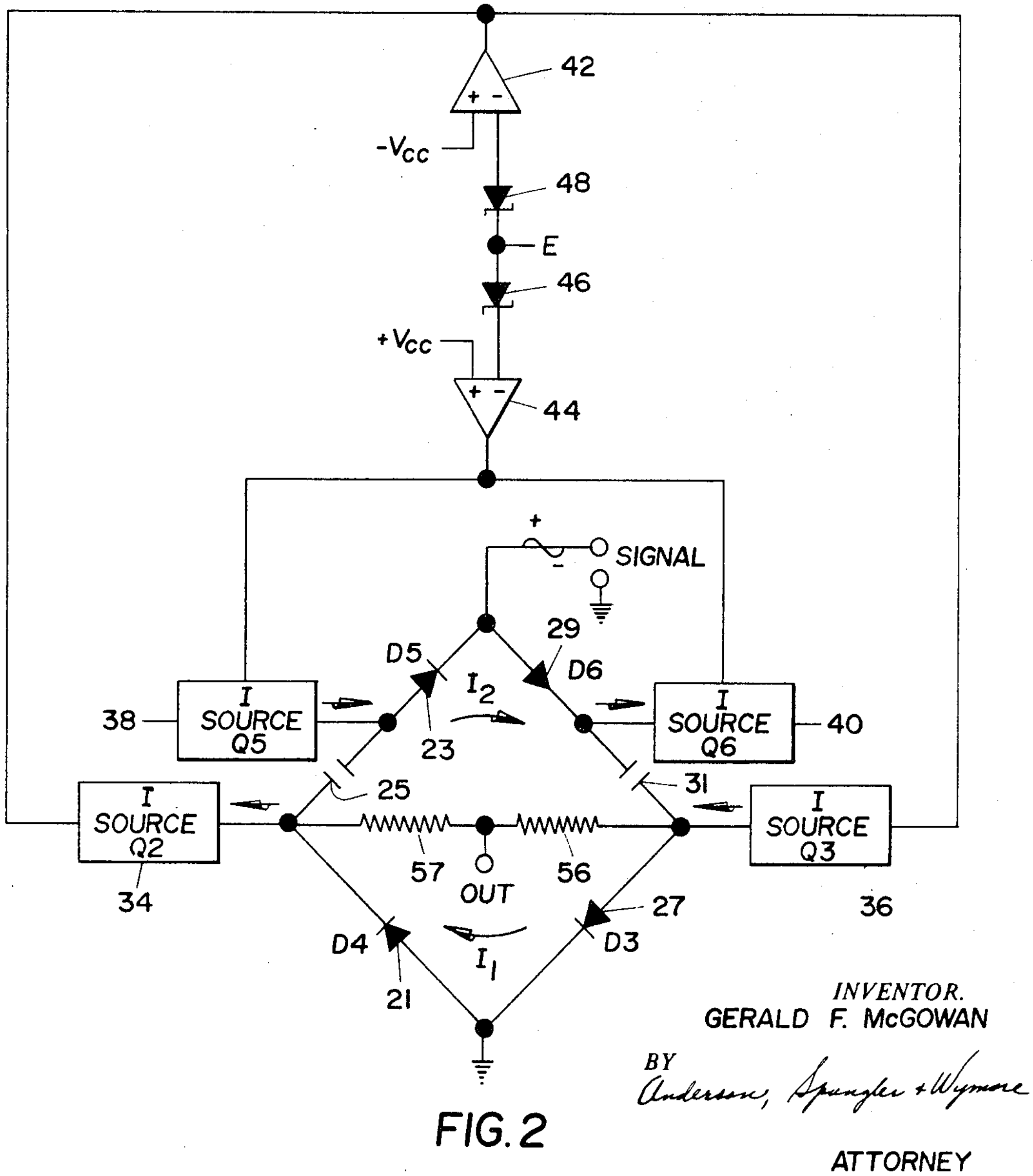
FIG. 2 is a block diagram of the circuit of the present invention.
Figure 3:
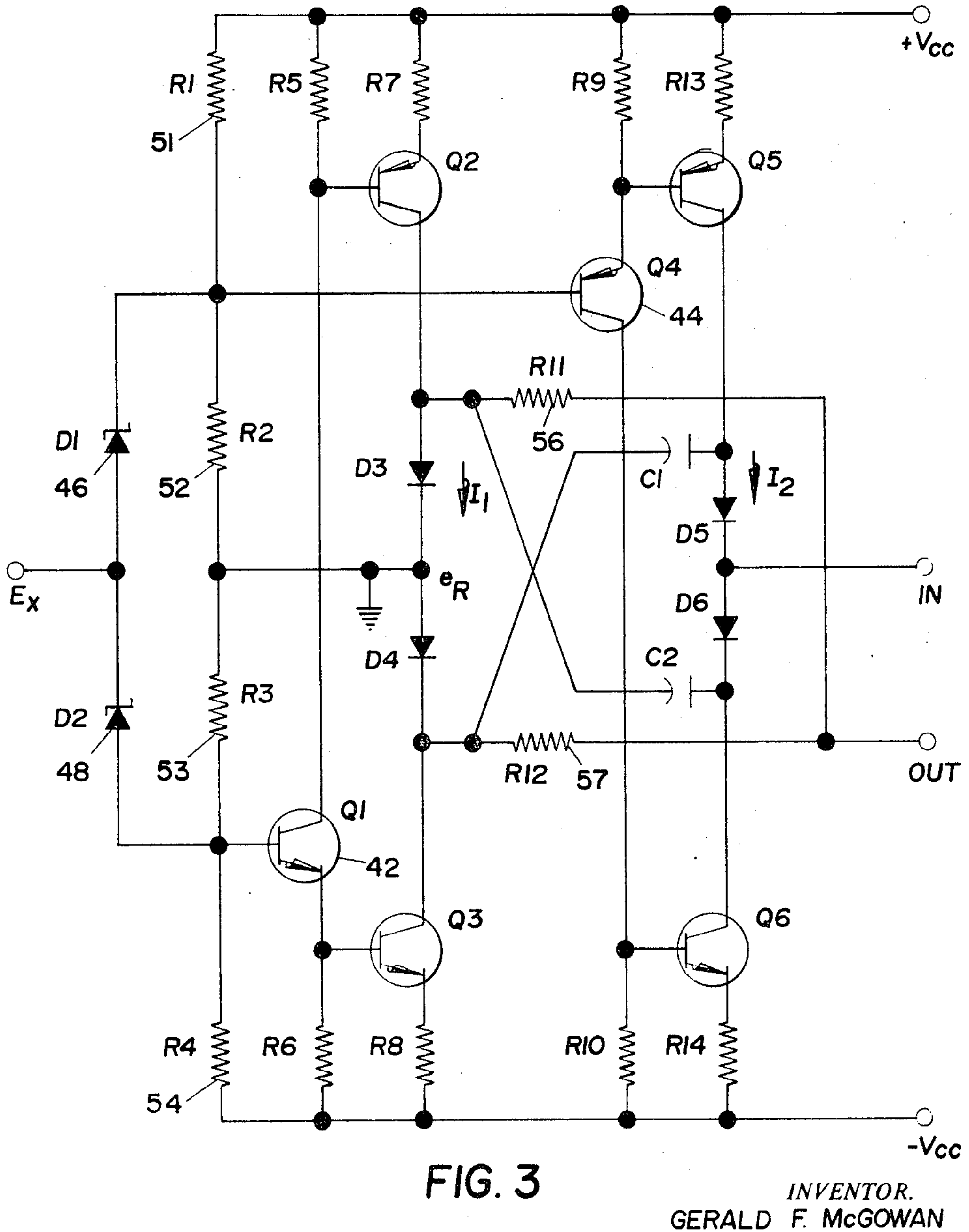
FIG. 3 is a schematic diagram of the circuit of the present invention.

In view of the unacceptable limitations of the simplified form of a circuit as shown in FIG. 1, an improved device has been conceived which is the subject matter of this discussion. The preferred embodiment of the invention is illustrated in FIGS. 2 and 3 which show a configuration employing two parallel diode voltage dividers or attenuators having symmetrical current sources and arranged with the control voltage input so that the current arising from the signal input voltage is superimposed in the dividers upon a quiescent divider current in such a manner that the signal current reduces the quiescent current in one of the dividers and increases it in the other of the dividers. The voltage outputs from the two dividers are resistively summed to obtain the desired output voltage. The use of parallel dividers in this fashion operates to reduce distortion over a wide frequency range and to increase the maximum tolerable input signal magnitude. The logarithmic relationship is determined by the specific arrangement of linear components and the selection of design parameters, the primary ones of which are the nominal values of divider current and the ratios of maximum to minimum divider currents.

By more specific reference to FIGS. 2 and 3, it is seen that one attenuator or divider comprises diodes 21 and 23 interconnected by a series capacitor 25, while the other divider comprises diodes 27 and 29 interconnected by a series capacitor 31. The diodes 21 and 27 are driven by equal and opposite transistor current sources 34 and 36. Similarly, the diodes 23 and 29 are driven by equal and opposite transistor current sources 38 and 40. The transistor current sources are driven by a pair of inverting stages comprising transistor 42 and 44 which are controlled by the input control voltage $E_x$.

In operation, as $E_x$ is increased, the current $I_1$ increases and the current $I_2$ decreases, causing the attenuation ratio to approach zero, according to the expression for $A_R$ previously set forth. Conversely, as $E_x$ is decreased, $I$ 1 decreases and $I_2$ increases, causing the attenuation ratio to approach unity.

Appropriate bias conditions are established by the zener diodes 46 and 48. The voltage dividers consisting of series connected resistors 50, 51, 52 and 53 are intended to prevent the current sources from reaching a bias point of complete cutoff.

It will be noted that the parallel diode voltage dividers are arranged for opposite polarity, thus the signal current adds to the bias current of one voltage divider and subtracts from the other. By resistively summing the outputs of the two voltage dividers or attenuators through resistors 56 and 57, an output signal is obtained which is relatively free of distortion. The maximum signal level which can be controlled with negligible distortion is approximately 26 millivolts measured from zero to peak.

Figure 5:
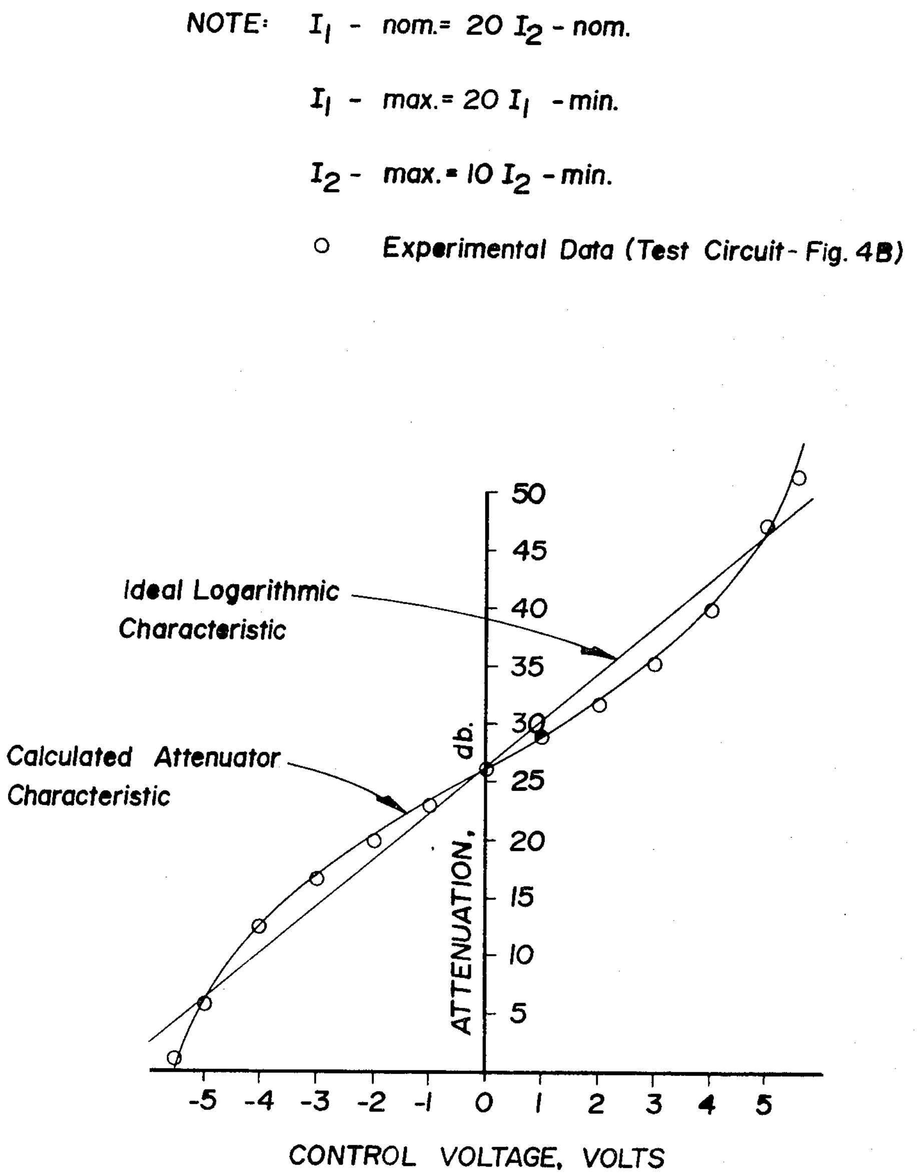
FIG. 5 is a graph showing the relationship between the control voltage applied to the attenuator and the gain of the attenuator in decibels.

The circuit of the preferred embodiment provides an approximate linear relationship between the control voltage $E_x$ and the logarithm of the attenuation ratio, as shown in FIG. 5. Since the diode resistance is a linear inverse function of the bias current, the logarithmic relationship is achieved by the arrangement of linear components and selection of design parameters, the primary ones of which are the ratio of the nominal values of $I_2$ to $I_1$, the ratio of $I_{2-max.}$ to $I_{2-min.}$ and the ratio $I_{1-max.}$ to $I_{1-min.}$. The slope of the curve shown in FIG. 5, its deviation from a true logarithmic relationship, and the range of attenuation can be controlled within limits by selection of component values. The attenuator characteristics are controlled by the transistor current sources which convert the control voltage into appropriate diode bias currents.

The current source circuit is easily analyzed if it is assumed that the circuit is symmetrical about ground. Under this condition, the negative and positive supply voltages are equal in magnitude to $V_{cc}$, and the plus and minus full scale values of the control voltage, $E_x$, are equal in magnitude to $E_{FS}$. Additionally, let $V_1=V_{D46}+V_{BE44}+V_{BE38}$ $V_2=V_{D48}+V_{BE42}+V_{BE36}$ where $V_{BE44}$, $V_{BE38}$, $V_{BE42}$ and $V_{BE36}$ represent the base to emitter voltage of transistors 44, 38, 42, and 36 respectively; and where $V_{D46}$ and $V_{D48}$ represent the voltage across the zener diodes 46 and 48 respectively.

Then, $I_1=V_{cc}-V_2+E_x/R_8$ $I_2=V_{cc}-V_1-E_x/R_{13}$

Now, $V_1$ and $V_2$ must be selected to yield the proper value of $E_{FS}$ and maximum/minimum current ratios.

Let $$A=\frac{I_{1-\max}}{I_{1-\min}} \qquad B=\frac{I_{2-\max}}{I_{2-\min}}$$

and $$I_{1-\max}=\frac{V_{cc}-V_2+E_{FS}}{R_8} \qquad I_{2-\max}=\frac{V_{cc}-V_1+E_{FS}}{R_{13}}$$

$$I_{1-\min}=\frac{V_{cc}-V_2-E_{FS}}{R_8} \qquad I_{2-\min}=\frac{V_{cc}-V_1-E_{FS}}{R_{13}}$$

Solving for voltages, we obtain $V_1=V_{cc}+E_{FS}(1+B)/(1-B)$ $V_2=V_{cc}=E_{FS}\ (1+A)/)1-A)$ and by substitution $$I_1=\frac{E_x-E_{FS}\dfrac{(1+A)}{(1-A)}}{R_8}$$

$$I_2=\frac{-E_x-E_{FS}\dfrac{(1+B)}{(1-B)}}{R_{13}}$$

$$C=\frac{I_1}{I_2}\text{ with }E_x=0$$

$$C=\frac{R_{13}}{R_8}\left(\frac{(1+A)(1-B)}{(1-A)(1+B)}\right)$$

$$A_R=\frac{1}{1+\left(\dfrac{I_1}{I_2}\right)}$$

$$=\frac{1}{1-\dfrac{(R_{13})}{(R_8)}\left(\dfrac{E_x-E_{FS}\dfrac{(1+A)}{(1-A)}}{E_x+E_{FS}\dfrac{(1+B)}{(1-B)}}\right)}$$

20, circuit values listed in table 1 were calculated to obtain the following parameters: $A=20$, $B=1$, $C=20$ and $E_{FS}=5$. Under the conditions the attenuation equation reduces to $$A_R=\frac{1}{1+22.1\left(\dfrac{(+E_x+5.53)}{(-E_x+6.11)}\right)}$$

From this equation it can be shown that the attenuation ratio is +6 db. with $E_x=+5$, +26 db. with $E_x=0$ and +46 db. with $E_x=-5$. The complete attenuation curve for this set of parameters is shown in FIG. 5. Experimental data obtained with the circuit values shown in table 1 is very similar to the calculated data. A slight discrepancy between calculated and experimental data occurs in the vicinity of the full scale values of the control voltage due to the curvature of the zener diode E–I characteristic curve at low current levels. This source of error can be largely eliminated by substituting current sources for resistors R1 and R4.

Figure 4:
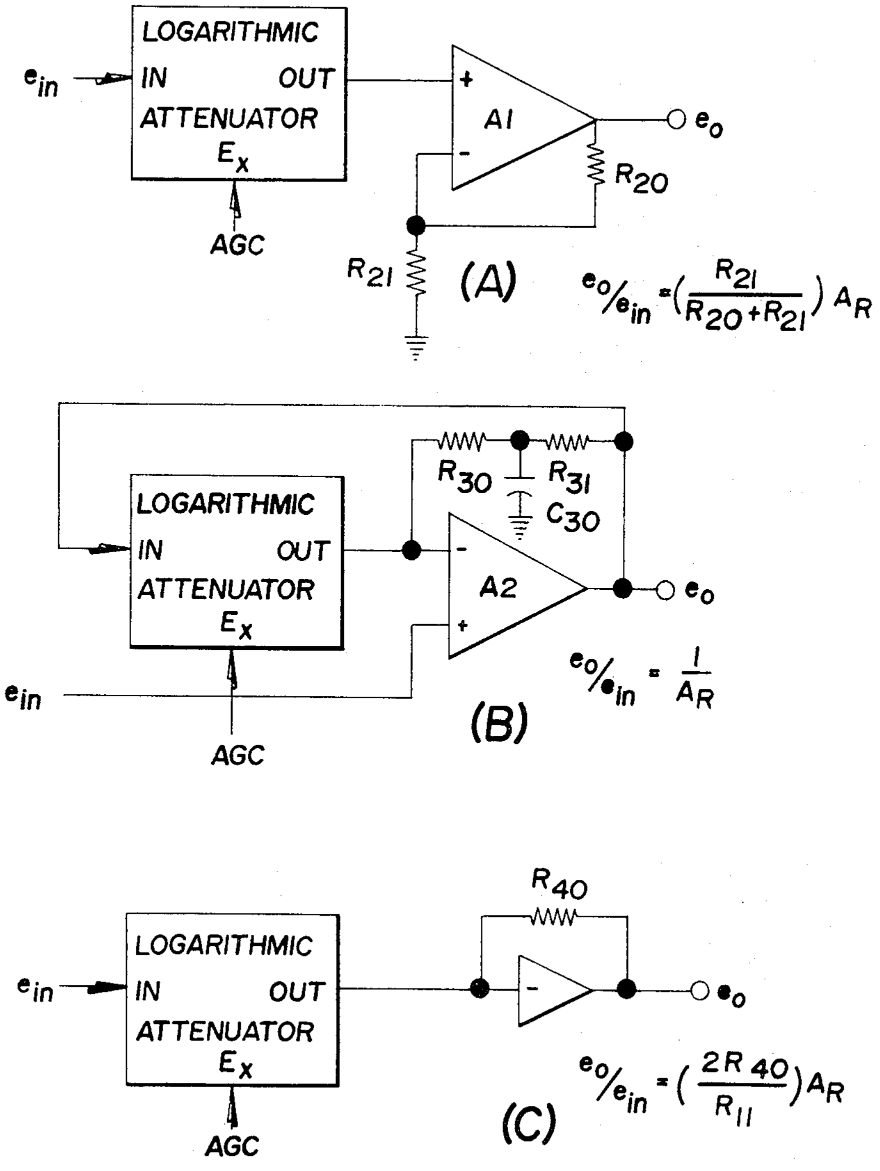
FIG. 4 shows block diagrams of typical automatic gain control amplifier circuits showing the logarithmic attenuator of the present invention in the input circuit to the amplifiers.

The described logarithmic attenuator may be used with operational amplifiers to obtain an AGC amplifier in which the control voltage is proportional to the logarithm of the signal gain. Several typical AGC amplifier configurations and resultant gain expressions are shown in FIG. 4. It will be noted that the desired operation is based on the assumption of a signal source impedance of zero and an infinite load impedance. The circuit shown in FIG. 4A is designed to utilize the high input impedance of the noninverting amplifier configuration. In FIG. 4B the logarithmic attenuator is used in the feedback path of a high-gain amplifier and is ideally matched both to the low amplifier output resistance and high amplifier input resistance. The network consisting of R30, R31 and C30 must be used to provide DC stability. In FIG. 4C, the logarithmic attenuator is used in the input of an inverting high-gain amplifier. Resistors R11 and R12 (56 and 57) in FIGS. 2 and 3 are used as input summing resistors which in conjunction with the feedback resistor, R40, determine the overall gain.

TABLE I. TYPICAL VALUES

| | |
|---|---|
| D1 1N751A | R1 2K±5% |
| D2 1N752A | R2 20K±5% |
| D3 1N4862 | R3 20K±5% |
| D4 1N4862 | R4 2K±5% |
| D5 1N4862 | R5 10K±1% |
| D6 1N4862 | R6 10K±1% |
| Q1 2N3947 | R7 2.61K±1% |
| Q2 2N3251 | R8 2.61K±1% |
| Q3 2N3947 | R9 46.4K±1% |
| Q4 2N3251 | R10 46.4K±1% |
| Q5 2N3251 | R11 10K±1% |
| Q6 2N3947 | R12 10K±1% |
| C1 10μf | R13 56.2K±1% |
| C2 10 μf | R14 56.2K±1% |
| $V_{cc}=\pm12.5$V | |

I claim:

1. A signal attenuator comprising;
a source of control voltage;
a source of signal voltage;
a pair of voltage dividers connected in electrical parallel, said voltage dividers each comprising first and second diodes interconnected by a capacitor;
means connecting said voltage dividers in electrical parallel with said signal source;
first bias means interconnecting the said source of control voltage and a point intermediate the capacitor and the first one of said diodes in each of said voltage dividers;
second bias means interconnecting the said control voltage source and a point intermediate the capacitor and the second one of said diodes in each of said voltage dividers;
resistive output network means connected to the points of interconnection of the said second bias means and the said voltage dividers.

2. The combination of claim 1 wherein the voltage dividers are of opposite polarity.

3. The combination of claim 2 wherein the first and second bias means each include a pair of equal and opposite current sources.

4. The combination of claim 3 wherein the first and second bias means each include inverter means interconnected between the said control voltage source and the said current sources.

5. The combination of claim 4 and further including a zener diode interconnected between each of said inverter means and the said source of control voltage.

* * * * *